No. 740,070. PATENTED SEPT. 29, 1903.
W. C. F. ZIMMERMAN.
TAKE-UP AND CATCH BLOCK.
APPLICATION FILED FEB. 14, 1903.
NO MODEL.
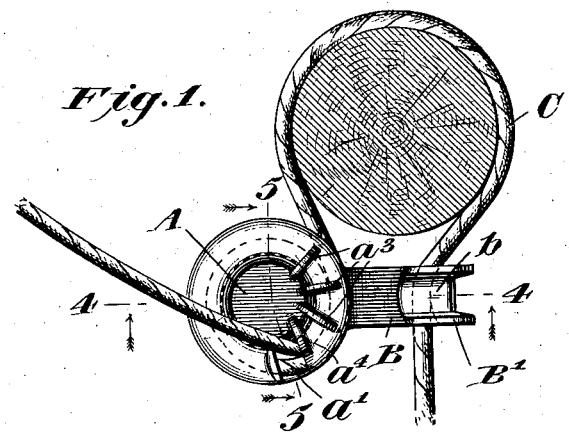
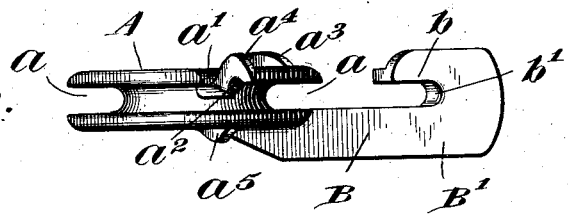
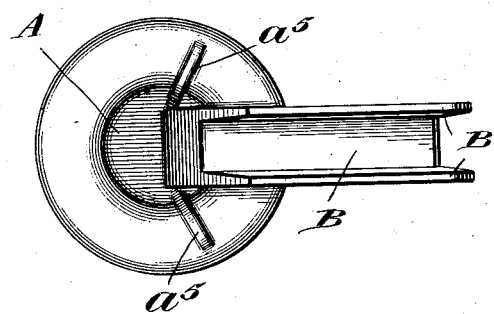
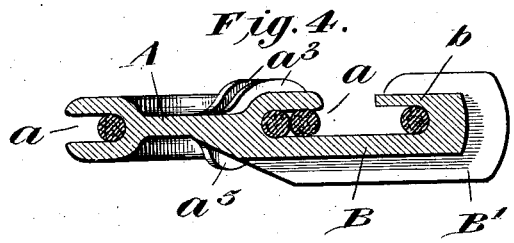
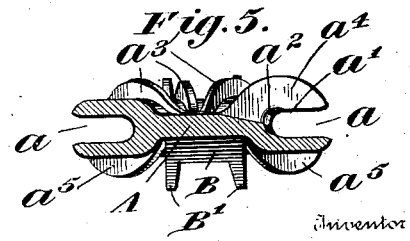
Witnesses
Elmer Leavey
James R. Mansfield
Inventor
William C. F. Zimmerman
By Alexander Dowell
Attorneys No. 740,070. Patented September 29, 1903.

UNITED STATES PATENT OFFICE.

WILLIAM C. F. ZIMMERMAN, OF LONETREE, IOWA.

TAKE-UP AND CATCH BLOCK.

SPECIFICATION forming part of Letters Patent No. 740,070, dated September 29, 1903.

Application filed February 14, 1903. Serial No. 143,292. (No model.)

*To all whom it may concern:*

Be it known that I, WILLIAM C. F. ZIMMERMAN, of Lonetree, in the county of Johnson and State of Iowa, have invented certain new and useful Improvements in Take-Up and Catch Blocks; and I hereby declare that the following is a full, clear, and exact description thereof, reference being had to the accompanying drawings, which form part of this specification.

This invention is an improved take-up and catch block for ropes and cables, especially designed for use in connection with stump-pulling machines where long cables are employed and where it is desirable to have a device by which the cable can be quickly attached to a stump and the slack taken up in an expeditious manner and which will hold the cable tightly and securely under the great strains to which it is subjected in drawing the stumps. The improved device also does away with the necessity for an auxiliary or attaching cable, which is ordinarily employed to fasten the take-up to the stumps while the draft-cable is connected with the take-up, and in this invention the draft-cable itself is used as the attaching-cable also and the take-up block also serves as a fastener to attach cable to stumps.

The improved take-up and block comprises a disk portion having a circumferential groove around which the cable is wrapped, so that it overlaps around nearly half the disk, the overlapped portion of the cable being pressed into the groove and held securely therein by the overlapping portion of the cable without any danger of cutting the cable, and the parts of the flanges subjected to the greatest strain may be reinforced by radially-disposed ribs. One of the flanges is slotted, so as to permit the slack end of the cable to be passed out of the groove. From the disk extends a radial arm, which is stiffened by flanges, which enable it to bear the enormous strain to which it is subjected, and on the extremity of this arm is a hook, which engages the draft run of the cable, so as to hold the cable around the stump and permit the cable to be quickly fastened or unfastened thereto without having to lift the cable-loops over or off the end of stump, a particular advantage of the device being that it requires the fewest possible bends of the cable, no injurious twists thereof, and no dangerous transverse biting-clamps thereon.

The device will be clearly understood from the following description, in connection with the drawings, which illustrate a preferred form of the invention, and the appended claims summarize the essential features thereof.

In said drawings, Figure 1 is a plan view illustrating the combined take-up and catch block in use. Fig. 2 is an enlarged side view of the device. Fig. 3 is a bottom view; Fig. 4, a section on line 4 4, Fig. 1; Fig. 5, a section on line 5 5, Fig. 1.

The combined take-up and catch has a disk-like body A, which is formed with a deep peripheral groove $a$, whose inner width is preferably slightly less than the diameter of the cable with which it is employed. At one side of the disk an opening or slot $a'$ is made in the upper flange to permit the block to be readily engaged with the cable and the free end of cable to be drawn therethrough without having to directly cross the path transversely the overlapping portion of the cable. The entrance end of the slot may be chamfered, as at $a^2$, to prevent the cable being injured by pressure against sharp angles. From the under side of the disk and lower flange thereof extends a radial arm B, this arm being about ninety degrees removed from the notch $a'$, and the upper surface of the arm being preferably about in the same plane as the inner side of the lower flange of the disk, as shown in Fig. 2. On the extremity of arm B is an inwardly-extending hook $b$, the sides of the hook being preferably chamfered, as at $b'$, to prevent cutting of the cable. This arm extends practically from the center of the disk portion A, but is made integral therewith and is provided with reinforcing-flanges B' on its under side edges, said flanges extending to and around the outer side edges of the hook $b$ and impart great strength and rigidity to the arm to enable the device to withstand the enormous strains to which it is subjected in pulling stumps.

The arm and flanges also stiffen the lower flange of the disk at a point where it is subjected to greatest strain, and the superimposed flange is likewise stiffened at such points and opposite the arm by substantially radially-disposed stiffening-ribs $a^3$, one such rib $a^4$ being at the edge of notch $a'$, adjacent to arm B. The lower flange of the disk may be further strengthened by radially-disposed ribs $a^5$ at opposite sides of the arm.

Operation: In using the device the pulling-cable C, one end of which is attached, for example, to any suitable draft mechanism, such as a winding-drum, has its free end passed around a stump or other object to be pulled or fastened to. Then the free end of the cable is passed through slot $a'$ into groove $a$ and the take-up turned so as to wrap the cable upon itself in the groove $a$ until it is wrapped about one and a half times around the block, the overlapping portion of the cable extending directly to the stump and pressing the overlapped portion by a lateral thrust into the groove $a$. The hook B' is then caught over the adjacent forwardly-extending run of the cable, thus causing it to practically encircle the object, and the more the cable is tautened by pulling thereon the tighter is the cable gripped or held by the block, the cable being held by its friction against the block, which is non-rotatable, and by the lateral pressure of the overlapping portion thereof against the inner overlapped portion, which is crowded tightly toward and against the bottom of the groove $a$.

The combined slack take-up and catch is particularly adapted for use with stump-pullers in which the main cable may be two hundred or more feet long; but by using this take-up the cable can be readily attached to any object far or near within the length of the cable without loss of time in taking up slack by driving the sweep or winding-drum, as the take-up and catch can be used at any point of the cable, while the hook catching the draft run of the cable will make a secure snare-loop around a stump or other object without the employment of any auxiliary fastening rope or cable, and the cable can be instantly released from an object when desired by disengaging the hook and then turning the disk, so as to unwrap it from the cable.

Having thus described my invention, what is therefore claimed as new, and upon which Letters Patent is desired, is—

1. A combined take-up and catch for cables, comprising a disk having a peripheral circumferential groove around and in which the free end of the cable is wrapped, an opening in one of the flanges of the groove for the passage of the overlapped free slack end of cable, and a radially-extending arm adjacent to the portion of the disk where the cable is overlapped, and an inwardly-turned hook on the outer end of said arm lying opposite the periphery of the disk and adapted to engage the draft portion of the cable and hold the same looped around an object, substantially as described.

2. A combined take-up and catch for cables, comprising a disk having a circumferential peripheral groove, in which the cable is wrapped and overlapped, a notch or opening in one of the groove-flanges for the passage of the free slack end of cable, an integral arm extending from the under side of disk provided with a catch-hook on its outer end adapted to engage the draft portion of the cable and hold the cable looped around an object, said arm and hook having reinforcing side flanges for the purpose and substantially as described.

3. The herein-described take-up and catch for cables, comprising a disk-like body having a circumferential groove in its periphery, a notch in the top flange of the groove extending to the bottom of the groove, radiating ribs on the upper side of the disk to strengthen the top flange, a radially-extending arm projecting from the under side of the disk and stiffening the under flange thereof, opposite flanges on the side edges of said arm to stiffen the same, and an inwardly-extending hook on the extremity of said arm, the slack end of cable being secured in the groove of the disk, the cable looped around an object and the draft portion of the cable being engaged with the hook whereby the cable can be held clamped around the object to which it is attached, substantially as and for the purpose described.

In testimony that I claim the foregoing as my own I affix my signature in presence of two witnesses.

WILLIAM C. F. ZIMMERMAN.

In presence of—
HENRY E. PORTER,
W. H. YOUNKIN.